United States Patent [19]

Smith et al.

[11] 4,058,652
[45] Nov. 15, 1977

[54] AUTOREFRIGERATION PROCESS AND APPARATUS

[75] Inventors: Stuart B. Smith; James J. McAlpin, both of Baytown, Tex.; Jose M. A. Peruyero, Morris Plains, N.J.; Ronald L. Hazelton, Mendham, N.J.; Edward F. Upchurch, Chatham, N.J.

[73] Assignee: Exxon Research & Engineering Co., Linden, N.J.

[21] Appl. No.: 656,983

[22] Filed: Feb. 10, 1976

[51] Int. Cl.² ............................ C08F 2/02; C08F 2/06; C08F 10/00
[52] U.S. Cl. ................................ 526/68; 526/70
[58] Field of Search ...................... 526/68, 70

[56] References Cited

U.S. PATENT DOCUMENTS

| | | | |
|---|---|---|---|
| 3,062,796 | 11/1962 | Greene et al. | 526/70 |
| 3,126,365 | 3/1964 | Hooker | 526/70 |
| 3,193,360 | 7/1965 | Scoggin | 526/68 |
| 3,944,534 | 3/1976 | Sennari et al. | 526/351 |

*Primary Examiner*—Alan Holler
*Attorney, Agent, or Firm*—David A. Roth; Ben C. Cadenhead

[57] ABSTRACT

The fouling of autorefrigeration polymerization systems because of entrained particles in the vaporized solvent-diluent is substantially reduced by returning the recycle solvent-diluent into the reaction zone through nozzles which provide a solvent-diluent spray of an average droplet size of less than 1000 microns, preferably between about 225 and 300 micron average particle size, which spray removes major amounts of entrained particles down to 5 microns in size. The solvent diluent may be an inert material or unreacted alpha-olefin, such as propylene.

7 Claims, 6 Drawing Figures

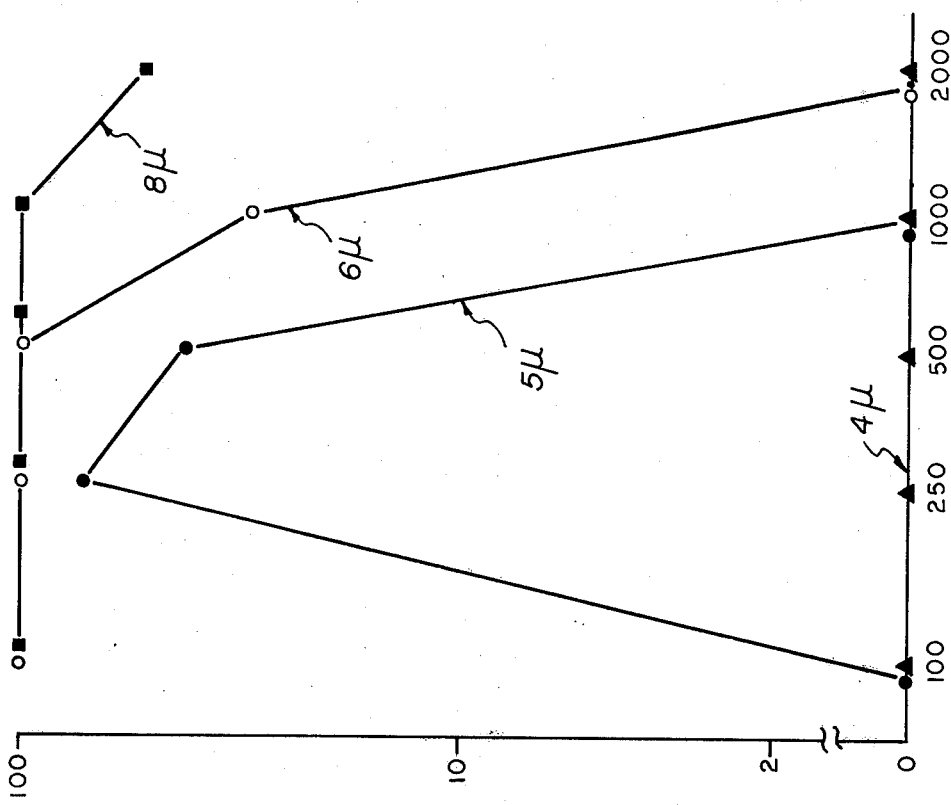
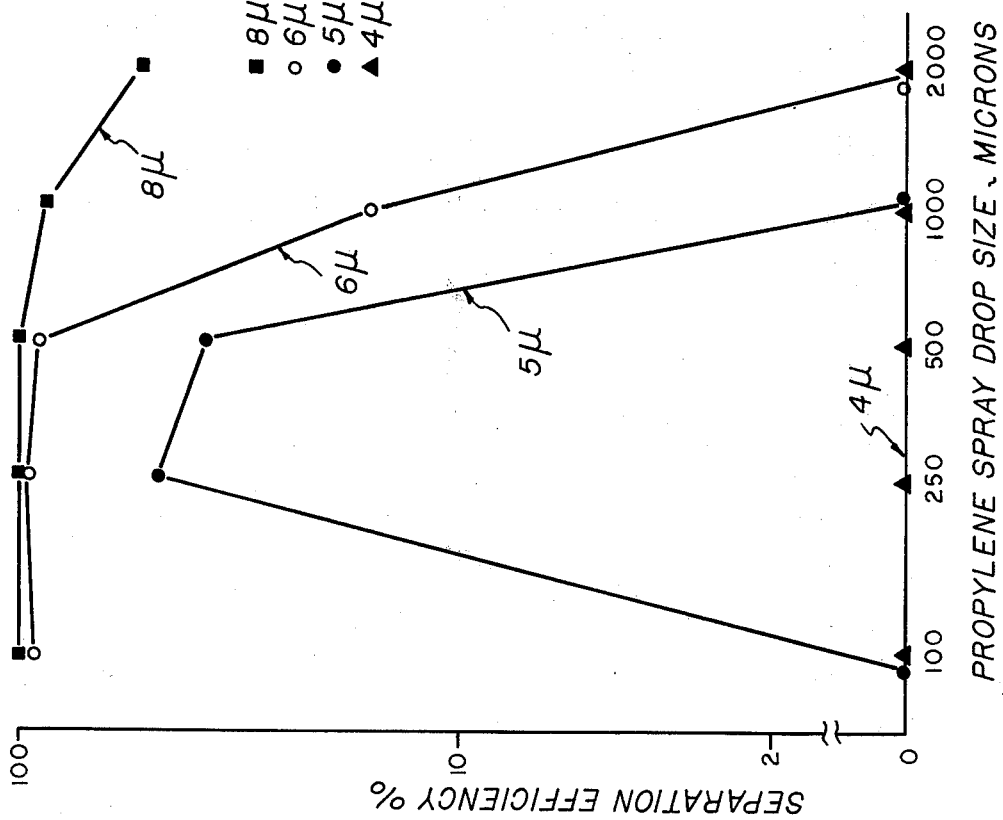

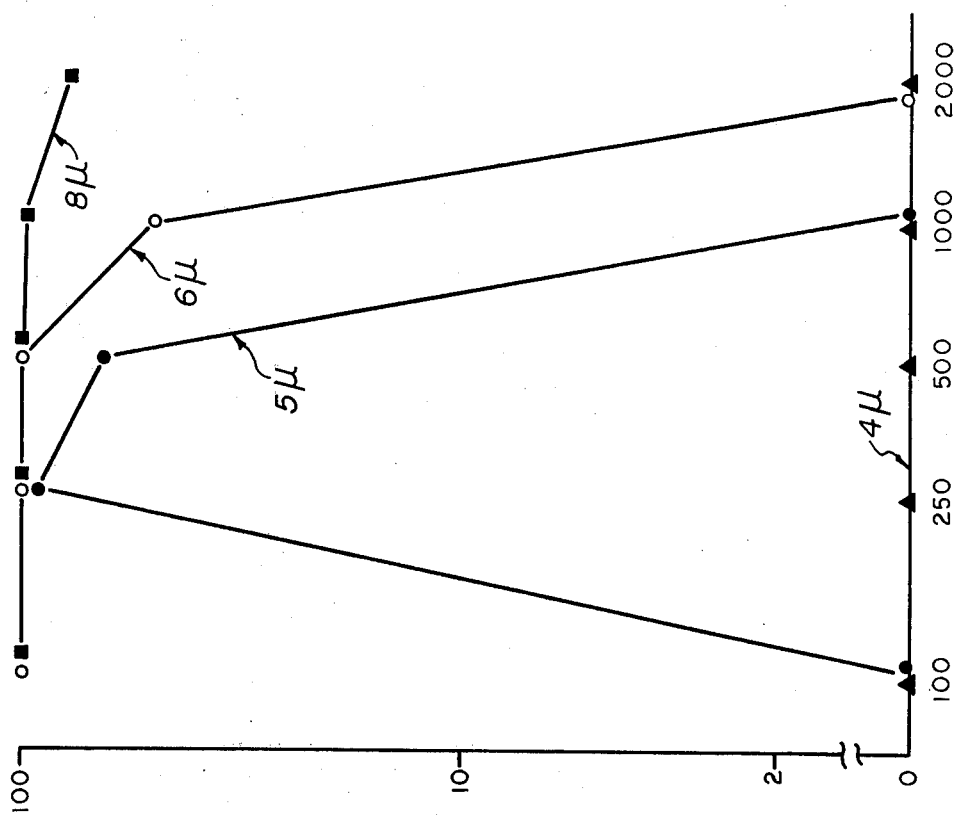
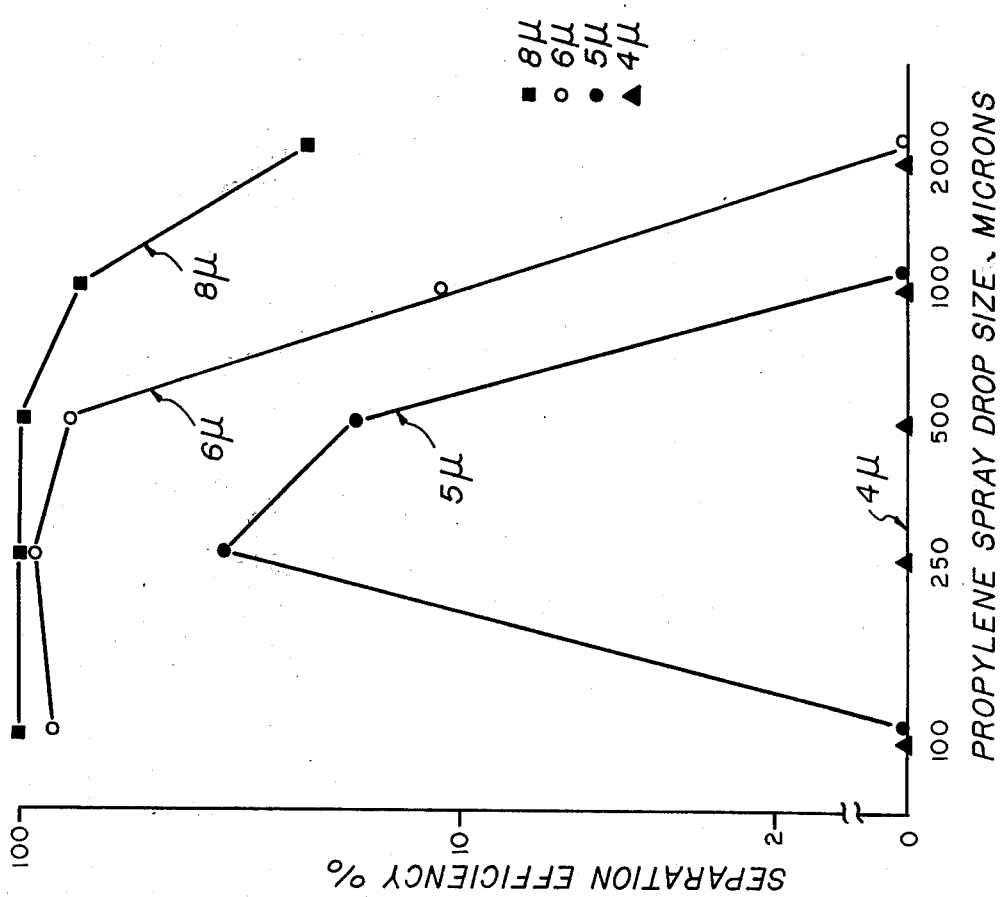

AUTOREFRIGERATION PROCESS AND APPARATUS

BACKGROUND OF THE INVENTION

The present invention relates to an autorefrigeration process for the preparation of alpha-olefin polymers. More particularly the present invention relates to an improvement in the process of autorefrigeration which reduces fouling. In one aspect the invention relates to novel apparatus for use in autorefrigeration.

Autorefrigeration generally and in this invention relates to the vaporization of solvent-diluent medium from a liquid phase reaction thereby removing exothermic heat of reaction and maintaining a substantially constant temperature in the medium remaining in solution. The vaporized solvent-diluent is usually recovered, for example in a condenser and recovered solvent-diluent is returned to the reactor.

There are a number of embodiments relating to autorefrigeration. In some embodiments, the solvent-diluent is a single material such as toluene, in other embodiments the solvent-diluent is a constant boiling azeotrope such as benzenecyclohexane. In other reactions the solvent-diluent which is vaporized, recovered, condensed, and returned to the reactor, is either the reactant or one of the reactants in the system. This latter embodiment is of particular interest in regard to the polymerization of alpha-olefins. In any autorefrigeration, temperature control requires a vapor space in the reaction vessel into which the vaporized solvent-diluent medium expands. One of the common difficulties in autorefrigeration has been the fouling of the reactor at the vapor-liquid interface, in the case of the polymerization reaction, and also the fouling of the condenser because of the entrained material carried overhead with the vaporized solvent-diluent.

It is a feature of the present invention that autorefrigeration reactions carried on according hereto, are able to be carried out for periods substantially longer than the prior art method and processes, before fouling requires the shut down and clean up of the reactor and related equipment.

It is a particular feature of the present invention that a particular method of returning the recovered and cooled solvent-diluent to the reactor and to the reaction medium has been discovered, which result in substantially reduced fouling of the system.

DRAWINGS

FIG. 1 is a graph showing the separation efficiency of entrained particles according to the present invention for one set of reactor conditions.

FIG. 2 is a graph showing the separation efficiency of entrained particles according to the present invention for an alternative set of reactor conditions.

FIG. 3 is a graph showing the separation efficiency of entrained particles according to the present invention for an alternative set of reactor conditions.

FIG. 4 is a graph showing the separation efficiency of entrained particles according to the present invention for an alternative set of reactor conditions.

SUMMARY OF THE INVENTION

Figure 6:
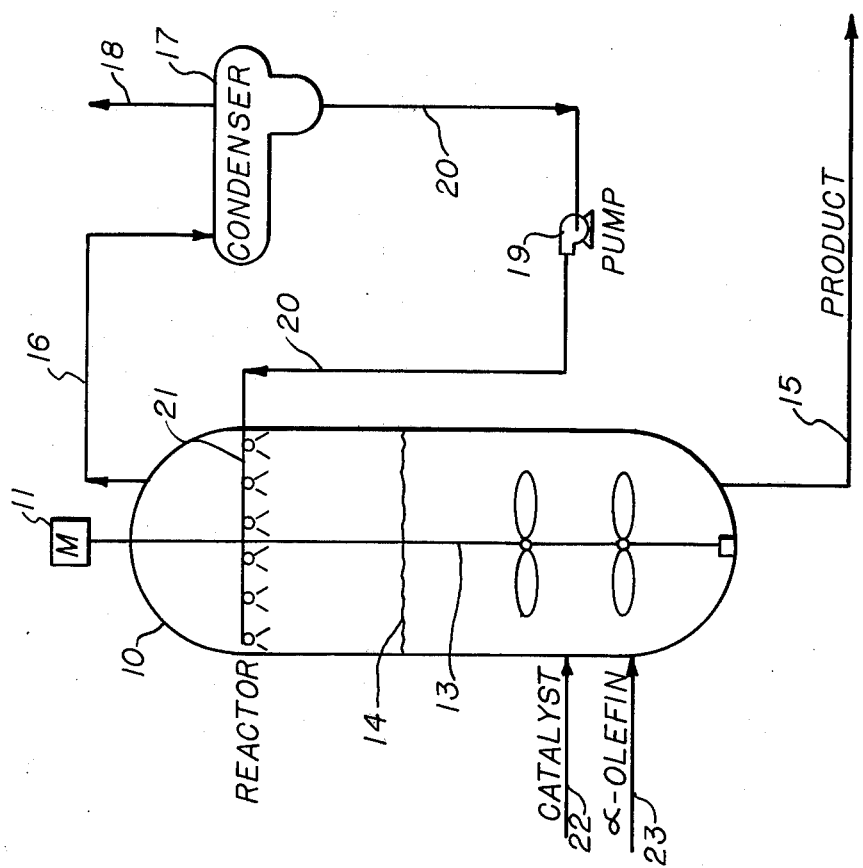
FIG. 6 is a schematic representation of an autorefrigeration polymerization system employing the present invention.

Briefly stated, the present invention is an improvement in the autorefrigeration reaction of alpha-olefins to produce polymers in a reaction zone comprising reacting $C_2$ to $C_8$ alpha-olefins at temperatures in the range of 20° to 90° C in the presence of a catalyst in a solvent-diluent in liquid phase to produce an alpha-olefin polymer, vaporizing a portion of said solvent-diluent from said liquid phase recovering said solvent-diluent, condensing said solvent-diluent and returning a portion of said solvent-diluent to said reaction zone wherein the improvement comprising returning said condensed solvent-diluent into said reaction zone as a spray having a drop average particle size of less than 1000 microns.

Preferably the drop size of the spray is less than about 600 microns and greater than about 200 microns, with a preferred size of said spray particles being about 225 to 300 microns average diameter. It has been discovered that by using a spray as defined hereinabove a substantial amount of the entrained particles in the vaporous solvent-diluent which caused the fouling on the walls of the reactor and fouling in the condenser, is removed from the vapor and returned to the reaction medium. The 1000 microns particle size is a critical limitation since it has been found that the average diameter of the entrained polymer particles, range between 3 and 15 microns. The critical range described here is effective to remove entrained particles of 5 microns and larger, which represents the major amount, i.e., over 50% by weight of the entrained material in the vaporous solvent-diluent. By removing this substantial amount of entrained solid materials in the vapor and causing it to fall back into the reaction medium, and by washing the walls of the reactor with the sprayed solvent-diluent, both the reactor fouling at the liquid vapor interface is substantially reduced as is the fouling in the overhead condensors. It has been observed that the reaction may be carried on under these conditions for periods up to 6 months as compared to 1 to 2 months under the prior art not employing this invention.

The solvent-diluent may very conveniently be a reactant, and for example in the case of the preparation of polypropylene by an autorefrigeration process, the reaction may be carried out in a bulk reaction wherein the monomer propylene is both the solvent-diluent and reactant.

One aspect of the present invention is an apparatus for carrying out autorefrigeration polymerization reactions comprising a reactor adapted to contain a liquid reaction phase, means to remove a vaporous overhead from said reactor, means to condense said vaporous overhead, and means to return said vaporous overhead to said reactor at a point above the liquid reaction phase in said reactor, said means for returning said condensed vaporous overhead comprising a plurality of nozzles located in said reactor, said nozzles being above said liquid phase and intermediate the liquid phase and said means for removing said vaporous overhead, said nozzles being adapted to return said condensed and cooled overhead to said reactor as a spray having an average drop particle size of less than 1,000 microns. The apparatus may additionally be equipped with means for adding additional reactants and solvents, and means for removing a product stream therefrom containing a polymerized material.

DETAILED DESCRIPTION OF THE INVENTION

Although the present invention will be described in detail in application to the autorefrigeration, bulk polymerization of propylene to produce polypropylene, the invention is quite satisfactory for the preparation of other olefins in bulk either to produce the homopolymers, or in combinations of polymers to produce various copolymers and terpolymers. In a preferred embodiment the solvent-diluent is unreacted polymerization monomer, eg, propylene. It is of course appreciated that the solvent-diluent need not be a reactant monomer, in order for the advantages of the present invention to be employed in an autorefrigeration reaction.

In addition to polymerization of propylene, the present process can be applied to other olefins such as ethylene, butene-1, hexene-1, vinyls; diolefins and vinyl aromatics such as styrene, alpha-methyl styrene, haloolefins, mixtures of these monomers and the like.

The autorefrigeration process as described herein may be employed to produce polyolefins such as polymers of mono-alpha-olefins, which comprise from 2 to 6 carbon atoms, for example, polyethylene, polypropylene, polybutene, polyisobutylenes, poly (4-methylpentene-1), copolymers of these various alpha-olefins and the like.

Vinyl polymers suitably prepared by the present process include polyvinyl chloride, polyvinyl acetate, vinyl chloride/vinyl acetate copolymers, polyvinyl alcohol and polyvinyl acetal.

Olefin-vinyl copolymers which may be prepared by the present autorefrigeration process include ethylene-vinyl acetate, ethylene-vinyl propionate, ethylene vinyl isobutyrate, ethylene-vinyl alcohol, ethylene-methyl acrylate, and the like. Olefin-allyl copolymers include ethylene/allyl alcohol, ethylene allyl acetate, ethylene-allyl acetone, ethylene-allyl benzene, ethylene-allyl ether, and the like.

Examples of some specific acrylic polymers producible herein are polymethyl methacrylate, polyacrylonitrile, poly-methylacrylate and polyethylmethacrylate. The polyamides suitable for use include polyhexamethylene adipamide, polyhexamethylene sebacamide, and polycaprolactam.

POLYMERIZATION CATALYSTS

Although the catalyst, and the particular specific processes of polymerization are in themselves not a part of the present invention, they are setforth here in order to provide an indication of the scope of the present invention.

The catalyst is normally prepared from a transition metal compound, preferably a halide, and a reducing component consisting normally of aluminum metal or a metal alkyl compound. Representative of the transition metal compounds used in a metal selected from Groups 4b, 5b, and 6b of the periodic System.* Included in the preferred species are the titanium halides, for example, titanium tetrachloride, titanium trichloride, and titanium dichloride, and mixtures thereof. Other metal compounds such as zirconium tetrahalide and hafnium tetrachloride, vanadium chloride, chromiun chloride, tungsten chloride, and the like, are especially useful. Still other transition metal halides containing halogens selected from the group consisting of bromine, iodine, chlorine, and in certain instances fluorine can also be used.

*Handbook of Chemistry and Physics, The Chemical Rubber Co., Cleveland, Ohio, 45th Edition, 1964, B-2.

The reducing component of the catalyst composition may be any of a variety of reducing agents. Most common among the reducing agents are the organometallic compounds such as triethyl aluminum, diethyl chloride, aluminum ethyl dichloride, aluminum diethyl hydride, aluminum triisobutyl, aluminum triisopropyl, and related compounds. Many other reducing agents such as lithium aluminum hydride, zinc ethyl hydride, and the like are described in the literature as useful reducing agents and can also be used. These catalysts are all of the now well known "Ziegler" variety.

Certain Ziegler catalysts, or more particularly certain modified Ziegler catalysts, have been found to be especially useful for polymerizing alpha-olefins. For example, a titanium trichloride catalyst modified with aluminum chloride having the formula, $TiCl_3 \cdot 1/3 AlCl_3$. Normally, this modified Ziegler catalyst is activated with a metal alkyl such as an aluminum alkyl, and preferably with an aluminum alkyl halide having the structural formula, $R_2AlX$ or $R_3Al_2X_3$, wherein R is selected from the group consisting of alkyl radicals containing 1 to 12 carbon atoms or phenyl or benzyl radicals, and X is a halogen atom selected from the group consisting of chlorine, bromine or iodine.

A variety of monomers may be polymerized with the Ziegler type catalysts. Any unsaturated hydrocarbon corresponding to the general formula $R-CH=CH_2$, wherein R is selected from the group consisting of an alkyl radical having from 1 to 6 carbon atoms, a phenyl radical, or an alkyl substituted phenyl radical can be used. Examples of specific unsaturated hydrocarbons which can be polymerized include alpha-olefins containing 3 to 8 carbon atoms, such as propylene, butene, isobutylene, pentene, isoamylene, hexene, isohexenes, heptene, isoheptenes, octene, isooctenes, and the like.

The preferred catalyst composition for the polymerization of propylene comprises a modified titanium trichloride having the structural formula, $TiCl_3 \cdot 1/3 AlCl_3$, activated with diethyl aluminum chloride. Ratios of diethyl aluminum chloride and titanium trichloride of between 0.3:1 and 6:1 may be advantageously used. The presence of an alkali metal generally in an amount of between 0.5 to 10 mols of an alkali metal halide per mol of reduced titanium tetrahalide, and preferably a mol ratio of from 0.8 to 5 mols of an alkali metal halide, such as sodium chloride, per mol of reduced titanium tetrahalide can be used for improving catalyst activity.

POLYMERIZATION CONDITIONS

The monomers may be polymerized at moderate temperatures and pressures with the Ziegler type catalysts described above, genrally at temperatures of 0° to 150° C, with temperatures on the order of 25° to 90° C being particularly useful. A solvent such as a paraffin or cycloparaffin having 3 to 12 carbon atoms, may be employed for the polymerizations, however, the olefin monomer is frequently used for this purpose. The polymerizations are preferably conducted under conditions that exclude atmospheric impurities such as moisture, oxygen and the like.

The pressure ranges from about atmospheric pressure to about several atmospheres, such as 20 or more atmospheres, with pressures in excess of about 500 p.s.i. rarely being employed.

After the polymer has been produced, the catalyst may be deactivated by contacting the polymeric reaction mixture with a material which reacts with and deactivates the catalyst. Such materials include, for example, lower alcohols, acetone and water.

In addition to the recycle solvent-diluent, fresh solvent-diluent as well as fresh reactants, if the solvent-diluent is not a reactant, may be added to the reactor in order to maintain the reaction and volume therein at a constant level, with the addition of fresh material being sufficient to offset at least a substantial portion of the exothermic heat of reaction and to permit the attainment commonly of a substantially isothermal reaction, i.e., the temperature of the charge and the effluent from the reactor may fall within the same range; and commonly the reactor outlet temperature may be 20° to 90° C for example around 50° C. The fresh reactants may be utilized at essentially the same temperature range, e.g., about 30° C, with the recovered and recycled solvent-diluent being appropriately in the same range e.g., 20° to 70° or 90° C thereby not requiring the fresh feed be added at the usual low temperatures of −20° to −50° C which would be required in non-autorefrigeration processes. From the practical point of view the reaction may be considered as adiabatic, in that no external heating or cooling will normally be required.

These are considerations that are also well known in regard to the art of autorefrigeration, and these are commonly adjusted according to thermodynamic considerations and actual observation and operation of the reactors.

EXAMPLES

To establish the present invention, studies were undertaken employing propylene polymerization to produce polypropylene using a Ziegler type catalyst with the main variables under consideration being the distance of the nozzles above liquid-vapor interface, i.e., 5, 10 and 15 feet, the spray drop diameter, 100 to 200 microns, the liquid injection rate 2 to 700 gallons per minute per 1000 cubic feet of vapor and entrained particle diameter of 3-15 microns. The results of these studies determining the separation efficiency of the spray size versus the particle size of the entrained polypropylene all establish that in order to remove the 5 micron entrained solid particle even in view of the variation of the tower height, i.e., height of nozzle above the interface, and the liquid injection rate, substantially the same size of spray particle is required. This is shown in the FIGS. 1-5. Hence it is seen that the spray droplet size needed is a function of the entrained solid particle size. The conditions represent in FIGS. 1-5 are:

FIG. 1 nozzles 15 feet above liquid-vapor interface, propylene injection rate through nozzles, 50 gallons per 1000 cubic feet of vapor (27.1 gpm.)

FIG. 2 nozzles 15 feet above liquid-vapor interface, propylene injection rate through nozzles, 100 gallons per 1000 cubic feet of vapor (54.2 gpm).

FIG. 3 nozzles 5 feet above liquid-vapor interface, propylene injection rate through nozzles, 100 gallons per 1000 cubic feet of vapor (54.2 gpm).

FIG. 4 nozzles 15 feet above liquid-vapor interface, propylene injection rate through nozzles, 200 gallons per 1000 cubic feet of vapor (109 gpm).

Figure 5:
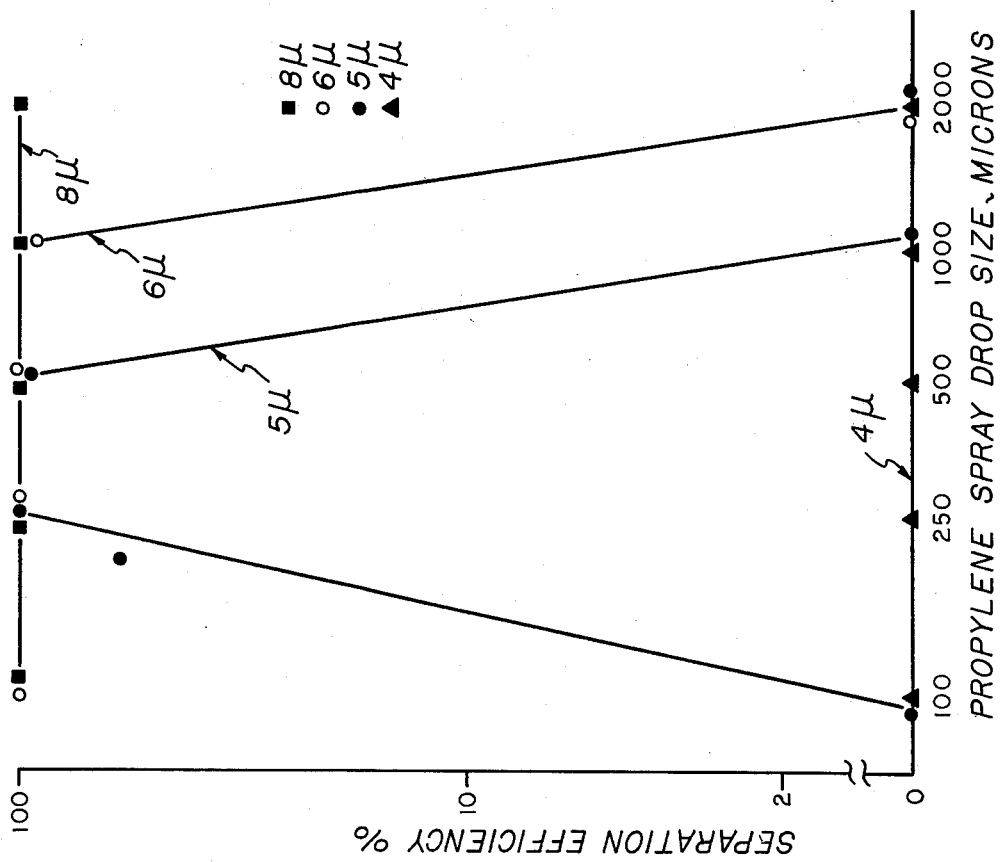
FIG. 5 is a graph showing the separation efficiency of entrained particles according to the present invention for an alternative set of reactor conditions.

FIG. 5 nozzles 15 feet above liquid-vapor interface, propylene injection rate through nozzles, 700 gallons per 1000 cubic feet of vapor (380 gpm).

The entrained particles are expressed in microns in these figures.

FIG. 6 shows a flow diagram and schematic representation of the present invention. Although the nozzles are a conventional item in themselves their utilization in the present environment is completely novel and unobvious.

The present invention is designed to remove a substantial portion of the entrained solid particles from the vaporized solvent-diluent, however, it be appreciated that entrained particles smaller than 5 microns will not be removed, in any event it has been found that the extended operation periods beyond that normally expected for this type of reactor indicates that probably a predominant amount, well beyond 50 weight percent of the entrained particles are being removed throughout the operation of the process.

Referring now to FIG. 6, an autorefrigerated reactor is shown. The reactor 10 is fed by olefin feed through line 23 and catalyst through line 22. The monomer reactant system is agitated by agitator 13 driven by motor means 11. Polymer product is removed via line 15 for further processing such as drying, deashing, etc. The liquid-vapor interface is indicated by line 14. The pressure in the reactor is adjusted as stated before in accordance with the particular system including the temperature of the feed and the desired temperature of the reaction, to allow the vaporization of a portion of the alpha-olefin from the liquid phase and its removal via line 16 to condenser 17 where the vaporous alpha-olefin monomer is condensed and returned via line 20 through pump 19 into the reactor 10 via nozzles 21. The condenser 17 is provided with an inert vent 18.

To illustrate the operation of the present invention a propylene feed at a temperature of about 50° F is fed to reactor 10 via line 23. An appropriate amount of a Ziegler type catalyst is fed to the liquid propylene via line 22 with agitation. The temperature of the reaction medium is about 140° F and the pressure in the reactor in the vapor space is approximately 325 psig. As the reaction proceeds under these conditions, a continuous vaporous overhead of propylene is removed via line 16 to condenser 17 where it is condensed and leaves condenser 17 at about 95° F and hence, is returned into the reactor through nozzles such as the Spraying Systems Co. No. 1/8 G5, full jet spray nozzle with a nozzle pressure drop of 100 psi which will provide a mean spray drop size of 250 microns. Twenty-five of these nozzles will provide approximately 55 gallons per minute of propylene recycle.

A commercial size reactor operated for commercial purposes employing this improvement was compared with a known commercial reactor not similarly adapted. The prior art reactor had been observed to have an increase in pressure drop in the condenser and a heat transfer coefficient decrease in the condenser and reactor jacket, and was operable for only 1 month because of a fouling of the overhead circuit.

In the apparatus according to the present invention no large change in the heat transfer coefficient of the reactor jacket was observed, however, the jacket did show a gradual decrease, which suggested some degree of fouling on the reactor wall. When the reactor was open approximately 3 months after commercial operation for cleaning, the reactor inner wall was covered with light powder about 1 centimeter thickness as far as the vapor zone was concerned, while the wall of a liquid zone was quite clean. Powder build-up was observed on the spray piping, however, there was no plugging of the nozzles. Powder accumulation which was anticipated from observation of the prior art commercial operation was not found in the overhead drum. As for the overhead condenser, fouling was also more slight than was expected (it having been expected that the degree of fouling at the end of 3 months operation period would at least be equal to that observed of 1 month in the prior art apparatus and procedure). There was very slight powder entrainment to the condenser, however there was no plugging of the tubes. The reactor overhead lines were covered with thin polymer film (1 to 3 mm, which caused no interference). From these inspections, the reactor spray system was determined to be effective to restrain the entrainment of fine particles to the overhead condenser, but was not as effective at washing the inner walls of the reactor as might be desired. In the commercial operation according to the present invention the liquid spray rate was kept at 43 gpm. The number of spray nozzles in the commercial embodiment was 21. The type of nozzle is that of a Spray System Company 1/8 G5 (equivalent) with the design of spray nozzle $\Delta P$ being 100 psi and spray rate of 100 gallons of 1000 cubic ft. of vapor.

The reaction zone as described therein is defined generally as being that portion of the system described in FIG. 6 as 10. It includes both the liquid phase portion of the reactor and vapor phase portion of the reactor 10. In constructing the reactor, it has been found that the nozzles 21 as shown in the FIG. 6 should be located in the upper portion of the reactor, above the level of the liquid phase, between liquid phase and the withdrawal point for line 16 whereby the vaporized solvent-diluent is withdrawn from the system. Preferably the nozzles are located in the upper ¼ of the reactor and are situated on a plane so that the pattern of spray from each nozzle intersects to that of an adjacent nozzle, and the nozzles located near the walls of the reactor 10 allow a portion of the spray to accumulate thereon and run down the wall thereby aiding in removing fouling occuring at the liquid vapor interface. The nozzles are adapted to provide between 2 and 700 gallons per minute, preferably between 50 and 200 gpm. of spray per thousand cubic ft. of vapor space in the reactor. The vapor space being that portion of the reactor excluding the liquid phase portion.

The entrained particles being carried overhead in the vaporized solvent-diluent medium, may be characterized as a combination of polymer and catalyst, in a weight ratio which may vary from about 20 to 800:1 weight ratio of polymer:catalyst It is also possible that the polymerization continues in the vapor phase, thereby resulting in even higher ratios of polymer to catalyst in the overheads. The fouling in the autorefrigeration reactors results from the entrained material, particularly the polymer, which plugs tubes, condensers, pumps and vents, and the like. Furthermore, the fouling on the walls of the reactor can be quite substantial from the entrained particles, with the fouling being greatest at the liquid-vapor interface. For example, in a commercial size reactor of approximately 20 foot diameter with a vaporization rate of solvent-diluent of 110,600 lbs. per hour, the vapor carryover as solid entrained particles is about 100 wt parts per million or somewhat less in a conventional autorefrigeration system not employing the present invention. By employing the present invention herein, the solid particle carry over may be reduced to 30 wt. parts per million or less, i.e., over 50% by weight reduction of the solid particles in the vaporized solvent-diluent according to the present invention.

The nozzles are located so that the vaporized solvent-diluent leaving the liquid phase and passing out of the reaction zone must pass through the spray. Thus the nozzles are preferably located between the liquid phase in the reaction zone and the point of removal of said vaporized solvent-diluent.

The examples herein have been actually carried out.

The invention claimed is:

1. In an autorefrigeration reaction of alpha-olefins to produce polymers comprising reacting $C_2$ to $C_8$ alpha-olefins in the presence of a catalyst at temperatures in the range of 20° to 80° C in a solvent-diluent in liquid phase in a reaction zone, vaporizing a portion of said solvent-diluent from the liquid phase in said reaction zone, said vaporized solvent-diluent containing entrained polymer particles in the range of 3 to 15 microns, removing, condensing said solvent-diluent, and returning a portion of said solvent-diluent to said reaction zone, wherein the improvement comprises returning condensed, solvent-diluent to said reaction zone as a spray, having a drop average particle size of less than 1000 microns, said vaporized solvent-diluent passing through said spray whereby over 50 weight % of said entrained polymer particles of 5 microns and larger are removed from said vaporized solvent-diluent.

2. The process according to claim 1 wherein the average drop particle size is less than about 600 microns and greater than about 200 microns.

3. The process according to claim 2 wherein the average drop average particle size is from about 225 to 300 microns.

4. The process according to claim 1 wherein said spray is produced by a plurality of nozzles in said reaction zone above said liquid phase.

5. The process according to claim 4 wherein said nozzles are located between said liquid phase and the removal of said vaporized solvent-diluent.

6. The process according to claim 1 wherein said solvent-diluent is a $C_2$ to $C_8$ alpha-olefin.

7. The process according to claim 6 wherein said alpha-olefin is propylene.

* * * * *